F. N. CONNET.
INTEGRATING AND RECORDING APPARATUS FOR METERS.
APPLICATION FILED MAY 29, 1907.
1,102,723.   Patented July 7, 1914.
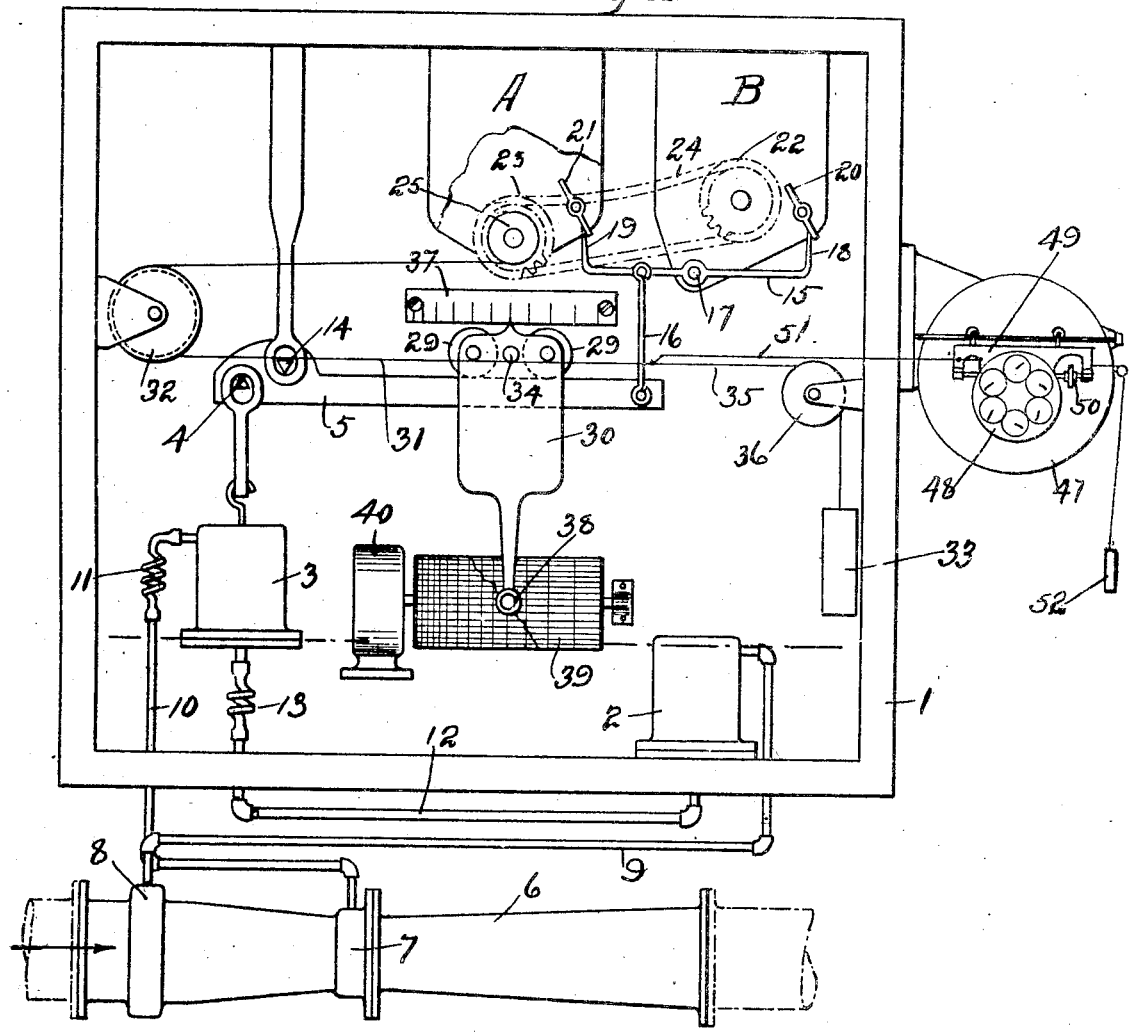
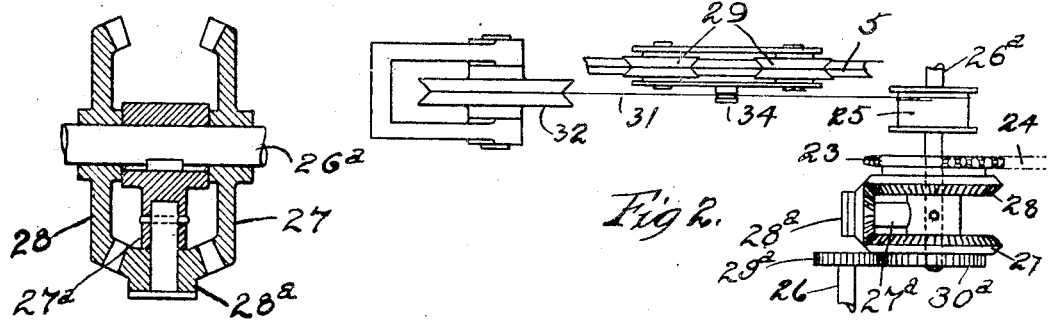
Witnesses
A. F. Boig
E. D. Ogden
Inventor
Frederick N. Connet
By
Howard E. Barlow
Attorney

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND.

INTEGRATING AND RECORDING APPARATUS FOR METERS.

1,102,723.      Specification of Letters Patent.      Patented July 7, 1914.

Application filed May 29, 1907. Serial No. 376,306.

*To all whom it may concern:*

Be it known that I, FREDERICK N. CONNET, a citizen of the United States, residing at the city of Providence, in the county of Providence and State of Rhode Island, have invented certain new and useful Improvements in Integrating and Recording Apparatus for Meters, of which the following is a specification, reference being had therein to the accompanying drawing.

This invention relates to recording, integrating and indicating apparatus for meters, and has for its object to provide a simple and practical apparatus for automatically indicating, integrating and recording the flow of liquids or gases through a given aperture, the apparatus being controlled in its action by the difference in pressures at two distinct points in the main supply pipe.

The apparatus is particularly designed to be applied to a pipe or tube similar in construction to that commonly known as the Venturi tube described in the United States Patent No. 281,373, dated April 17, 1888, and the several devices are arranged to be actuated by a clock, or other motor, which is controlled in its action by a weighing device operated by the difference in the pressures between two points in the tube.

In carrying out my invention two receptacles are employed the same being connected and arranged to contain a body of liquid (usually mercury) of greater specific gravity than the liquid to be measured. One of said receptacles is suspended from a scale beam, the contents of which is caused to vary in weight as more or less of the heavy liquid is forced therein, the quantity being proportional to the velocity through the tube. The varying weight of the contents of this receptacle is compensated for by a proportional movement of the counterbalance on the scale beam, which movement is recorded on a record sheet and is also caused to operate an integrating device. In order to indicate the movement of this counterbalance a recording pen is caused to be operated by the same to trace upon a continuously moving record sheet and record the variation of the flow and also show the quantity of liquids or gases in gallons or cubic feet which have passed through the tube. It is found in practice that there are many practical difficulties in the use of balancing springs for accomplishing this purpose, which in some cases have been used to take the place of the counterbalancing weight on the scale beam, among others being, that the spring is affected by the heat and cold. Then again, it is apt to become set after being in action a short time, in both of which cases the registering of the device is inaccurate.

The above difficulties are entirely obviated by the use of my improved construction which is operated by a counterbalance weight moved along the scale beam, which mechanism is not affected by any change in the temperature.

Another important feature of my construction is that the vertical movement of the suspended receptacle is very slight and therefore the length of the perishable flexible connection is reduced to a minimum.

The invention consists of other novel features and parts and combinations of the same as will be fully described hereinafter and then pointed out in the appended claims.

A practical embodiment of the invention is represented in the accompanying drawings, forming a part of this specification, in which similar characters of reference indicate corresponding parts in all the views.

In the drawings: Figure 1—is a diagrammatic view illustrating a general arrangement of the parts of the apparatus. Fig. 2— is a plan view showing the general arrangement by which the clock mechanism is connected to move the counterbalance carriage along the scale beam. Fig. 3—is an enlarged sectional view of the differential gears used in connection with the driving mechanism whereby either one of the two motors may operate through a single shaft to move the counterbalance in either direction.

Referring to the drawings at 1 is a framework illustrating a simple means for supporting the operating mechanism.

At 2 is a fixed receptacle which may be supported from the frame or from any other convenient place. A second receptacle 3 is suspended on knife edges 4 from the scale beam 5, the inner side of the bottom of this vessel and the inner side of the top of vessel 2 being normally in line with each other, the vertical position of this suspended vessel being changed temporarily by a change in the velocity through the tube.

The meter tube, which may of course be located at any convenient distance from the recording apparatus, is preferably constructed in the form of the said Venturi tube 6 which has a contracted portion or neck 7, the flow being through the same in the direction of the arrow. The upper end of receptacle 2 is connected to the up-stream portion at 8 through pipe 9, while the upper end of receptacle 3 is connected to the contracted portion 7 through the pipe 10 and the short section of flexible tubing 11. The bottoms of both receptacles are connected through the pipe 12 and the short section of flexible tubing 13.

The scale beam is suspended on the knife edges 14 near the end connected to the receptacle 3, the opposite end of said beam being connected to a pawl 15 through the connections 16, said pawl being pivoted at 17, each end of the same being turned up at 18 and 19 to engage the fans 20 and 21 respectively, which are driven by two distinct clock mechanisms A and B.

A sprocket wheel 22 is connected to the mechanism of clock B and a similar wheel 23 is attached to clock A, the two being connected by a sprocket chain 24 to operate a single drum 25 in the manner best illustrated in Fig. 2. When the beam is down fan 21 is disengaged to allow clock A to operate, and when the beam is up fan 20 is disengaged to allow clock B to operate, the double ended pawl being arranged to release one while the other is held against rotation. Both clock mechanisms are arranged to drive the drum 25, which is fixed to the shaft 26$^a$, through a system of differential gears 27, 28 and 28$^a$, best illustrated in Figs. 2 and 3, whereby when clock A is held clock B will drive through the sprocket chain 24, sprocket wheel 23, gear 28, to which said sprocket is fast, and pinion 28$^a$ which is mounted on the trunnion 27$^a$ and as this trunnion is keyed or pinned to the shaft 26$^a$ the rotating motion imparted to it by means of said gears would of course rotate the shaft 26$^a$ on which the drum is mounted. In order to obtain the reverse rotation of said drum, clock B is held and clock A by operating through the shaft 26, small pinion 29$^a$, gear 30$^a$, (which is attached to bevel gear 27) rotates said latter gear, also pinion 28$^a$ in the opposite direction whereby the drum is caused to again wind up the cord unwound by the operation of clock B.

Mounted on rollers 29—29 on the scale beam 5 is the counterbalancing weight 30 which is controlled in its movement along the scale beam by the rotation of the drum 25 to which the same is connected through the cord 31 led over pulley 32. When the cord is wound up on said drum the counterbalance is moved to the left and when the drum is turned in the opposite direction to slacken said cord said counterbalance is moved to the right through the medium of the counterweight 33 which is connected at 34 to said counterbalance through the cord 35 led over pulley 36.

As the movement of the counterbalance along the scale beam is in proportion to the difference in pressure or quantity passing through the pipe, a graduated scale or other convenient indicating means 37 has been arranged whereby the position of the pointer on this scale indicates the quantity in gallons, cubic feet, or other convenient unit of measure, which is passing through the meter. A recording pen 38 is also attached to or arranged to be operated by the movement of said counterbalance whereby the same may be moved over the face of a recording chart 39, said chart being shown in this construction as being connected to a drum and rotated by a clock mechanism (not shown) in the casing 40. The horizontal lines on the face of this chart denote the twenty-four hours of the day while the circumferential lines represent gallons or any other convenient unit of measure whereby the amount of flow passing through the pipe is continuously recorded so that the quantity, whether constant or varying, that has passed through at any period may be readily ascertained. An integrating device is also arranged to be operated by the movement of this counterbalance 30, said integrating mechanism being of the usual form including the disk 47 that is continuously rotated by a clock mechanism, not shown. A counter 48, mounted on the carriage 49, is operated by the contact wheel 50, said counter being controlled in its action by the movement of the counterbalance 30 through the connecting cord 51, the counterweight 52 causing said carriage to move to the right when permitted to do so by a similar movement of said counterbalance.

The operation of this device may be more fully described as follows: The receptacles 2 and 3 jointly contain a body of heavy fluid preferably mercury. When there is no flow the pressure at all points in the tube is, of course, equal and the mercury seeking its own level passes into the receptacle 2 filling the same even with the bottom of receptacle 3. As soon as the flow through the tube begins the pressure in the throat is decreased and becomes less than that at point 8, therefore a portion of the mercury corresponding to the difference in the pressures at the two points in the tube is forced from chamber 2 out through pipe 12 into the chamber 3. The heavy fluid in the suspended receptacle raises the outer end of the scale beam releasing the fan 20 and permits clock mechanism B to be set in motion and rotate the drum 25 allowing the counterbalance to be moved outward by the counterweight 33 until it balances the increased weight in said receptacle 3, the amount of movement being recorded on the record sheet, and the number of gallons, per unit of time, passing through the tube being indicated on the scale 37, and the total number of gallons which have passed through is shown by the integrating device. As soon as the flow decreases a reverse action takes place, a portion of the mercury being forced from the suspended receptacle into receptacle 2, the outer end of the scale beam falls releasing the fan 21 allowing clock A to actuate the drum 25 in the opposite direction, to draw the weight 30 to a point which will again balance the suspended receptacle and return the same to its original position.

This device is very practical in its operation and by its use an accurate reading of the rate of flow and the quantity that has passed through the tube may be readily obtained.

Having thus described my invention, what I claim as new and desire to secure by Letters Patent, is:—

1. In an apparatus of the character described, the combination of a conductor pipe, a scale beam system including a hollow member, means whereby the weight of the contents of said member may be automatically varied by a change of the flow through said conductor, counterbalance weight means on said system, and means whereby said weight means is automatically adjusted with reference to said system to accurately counterbalance any change in weight of the contents of said member.

2. In an apparatus of the character described, the combination of a conductor pipe, a scale beam, a hollow member supported by said beam, means whereby the weight of the contents of said member may be automatically varied by a change of the flow through the conductor, a counterbalance weight on said beam, means whereby said counterbalance is automatically moved along said beam a proportional distance to counterbalance each change in weight of the contents of said supported member, an integrating mechanism, and means whereby said mechanism is operated at a speed in proportion to the distance of said counterbalance from its zero or starting position.

3. In an apparatus of the character described, the combination of a conductor pipe, a scale beam system including a hollow member, means for automatically varying the weight of the contents of said member by a change of the flow through said conductor; counterbalance weight means on said system, a motor, means whereby said system by its position controls the action of said motor, and means whereby the said motor controls the movement of said weight means with reference to said system to accurately counterbalance any change in weight of the contents of the said member.

4. In an apparatus of the character described, the combination of a conductor pipe, a scale beam, a hollow member supported by said beam, means for automatically varying the weight of the contents of said member by a change of the flow through said conductor, a counterbalance weight on said beam, a motor, means whereby the position of said beam controls the action of said motor, and means whereby the action of said motor controls the movement of said weight along said beam to accurately counterbalance any change in weight of the contents of the supported member, and integrating mechanism, and means whereby said mechanism is operated at a speed in proportion to the distance of said counterbalance from its zero or starting position.

5. In an apparatus of the character described, the combination of a main supply pipe, a scale beam, a receptacle supported by said beam, means for automatically varying the weight of the contents of said receptacle by a difference between the pressure at two points in said pipe, a counterbalance weight on said beam, means whereby said counterbalance is automatically moved along said beam a distance sufficient to counterbalance each change in weight of the contents of said receptacle, an integrating mechanism, and means whereby said mechanism is operated at a speed in proportion to the distance of said counterbalance from its zero or starting position.

6. In an apparatus of the character described, the combination of a scale beam, a main supply pipe containing different fluid pressures, two receptacles jointly containing a body of liquid of greater specific gravity than that of the fluid to be measured, means connecting said receptacles, one of said receptacles being supported by said scale beam, means whereby the differential pressure of the fluid to be measured causes a proportional flow of said heavy liquid from one receptacle to the other, a counterbalance on said beam, means whereby said counterbalance is automatically moved along said beam a distance sufficient to counterbalance each change in weight of the contents of the receptacle supported on said beam, and means whereby the movement of said counterbalance may be caused to control the indicating of the rate of flow of the fluid to be measured.

7. In an apparatus of the character described, the combination of a main supply pipe, a scale beam, two receptacles jointly containing a body of liquid of greater specific gravity than that of the fluid to be measured, means connecting said receptacles, one of said receptacles being supported by said scale beam and normally held at a given level, means whereby the difference between the pressures at two points in said pipe causes a proportional flow of said heavy liquid from one receptacle to the other, a counterbalance on said beam, means whereby said counterbalance is caused to be moved along said beam a distance sufficient to counterbalance the receptacle supported on said beam and its contents, and means coöperating with said counterbalance for showing the amount of fluid passing through said pipe.

8. In an apparatus of the character described, the combination of a main supply pipe, a scale beam, two receptacles jointly containing a body of liquid of greater specific gravity than that of the fluid to be measured, means connecting said receptacles, one of said receptacles being supported by said scale beam and normally held at a given level, means whereby the difference between the pressures at two points in said pipe cause a proportional flow of said heavy liquid from one receptacle to the other, a counterbalance on said beam, means whereby said counterbalance is caused to be moved along said beam a distance sufficient to counterbalance the receptacle supported on said beam and its contents, and means controlled by the position of said counterbalance for operating an integrating mechanism.

In testimony whereof I affix my signature in presence of two witnesses.

FREDERICK N. CONNET.

Witnesses:
E. C. ATKINS,
HOWARD E. BARLOW.